United States Patent [19]

Tanner et al.

[11] E Re. 30,080

[45] Reissued Aug. 21, 1979

[54] TITANIUM-BERYLLIUM BASE AMORPHOUS ALLOYS

[75] Inventors: Lee E. Tanner, Summit; Ranjan Ray, Morristown, both of N.J.; Carl F. Cline, Walnut Creek, Calif.

[73] Assignee: Allied Chemical Corporation, Morris Township, Morris County, N.J.

[21] Appl. No.: 823,802

[22] Filed: Aug. 11, 1977

Related U.S. Patent Documents

Reissue of:

[64] Patent No.: 3,989,517
Issued: Nov. 2, 1976
Appl. No.: 572,563
Filed: Apr. 28, 1975

U.S. Applications:

[63] Continuation-in-part of Ser. No. 519,394, Oct. 30, 1974, abandoned.

[51] Int. Cl.[2] ..... C22C 14/00

[52] U.S. Cl. ..... 75/175.5; 148/3

[58] Field of Search ..... 75/175.5, 135; 148/2,3; 164/122, 125, 126, 127, 128

[56] References Cited

U.S. PATENT DOCUMENTS

| | | | |
|---|---|---|---|
| 3,297,436 | 1/1967 | Duwez | 75/134 |
| 3,427,154 | 2/1969 | Mader et al. | 75/134 |
| 3,856,513 | 12/1974 | Chen et al. | 75/176 |

*Primary Examiner*—Wayland W. Stallard
*Attorney, Agent, or Firm*—Ernest D. Buff; Gerhard H. Fuchs

[57] ABSTRACT

Amorphous metal alloys are prepared from titanium-beryllium base compositions comprising about 48 to 68 atom percent titanium and about 32 to 52 atom percent beryllium, with up to about 10 atom percent of beryllium replaced by additional alloying elements such as transition metals and metalloids. These alloys evidence high strength, good ductility and low density. The alloys are potentially useful in applications requiring a high strength-to-weight ratio.

6 Claims, 2 Drawing Figures

TITANIUM-BERYLLIUM BASE AMORPHOUS ALLOYS

Matter enclosed in heavy brackets [ ] appears in the original patent but forms no part of this reissue specification; matter printed in italics indicates the additions made by reissue.

This is a continuation-in-part of application Ser. No. 519,394, filed Oct. 30, 1974, now abandoned.

BACKGROUND OF THE INVENTION

1. Field of the Invention

This invention relates to amorphous metal alloys, and, more particularly, to high strength, low density titanium-beryllium base compositions.

2. Description of the Prior Art

Investigations have demonstrated that it is possible to obtain solid amorphous metals from certain alloy compositions. An amorphous substance generally characterizes a non-crystalline or glassy substance, that is, a substance substantially lacking any long range order. In distinguishing an amorphous substance from a crystalline substance, X-ray diffraction measurements are generally suitable employed. Additionally, transmission electron micrography and electron diffraction can be used to distinguish between the amorphous and the crystalline state.

An amorphous metal produces an X-ray diffraction profile in which intensity varies slowly with diffraction angle. Such a profile is qualitatively similar to the diffraction profile of a liquid or ordinary window glass. On the other hand, a crystalline metal produces a diffraction profile in which intensity varies rapidly with diffraction angle.

These amorphous metals exist in a metastable state. Upon heating to a sufficiently high temperature, they crystallize with evolution of a heat of crystallization, and the X-ray diffraction profile changes from one having glassy or amorphous characteristics to one having crystalline characteristics.

It is possible to produce a metal which is totally amorphous or which comprises a two-phase mixture of the amorphous and crystalline state. The term "amorphous metal", as employed herein, refers to a metal which is at least 50% amorphous, and preferably at least 90% amorphous, but which may have a small fraction of the material present as included crystallites.

Proper processing will produce a metal alloy in the amorphous state. One typical procedure is to cause molten alloy to be spread thinly in contact with a solid metal substrate such as copper or aluminum so that the molten metal loses its heat to the substrate. When the alloy is spread to a thickness at about 0.002 inch, cooling rates of the order of $10^{6°}$ C./sec. are achieved. See, for example, R. C. Ruhl, Vol. 1, Materials Science and Engineering, pp. 313–319 (1967), which discusses the dependence of cooling rates upon the conditions of processing the molten metal. Any process which provides a suitable high cooling rate, as in the order of $10^{5°}$ to $10^{6°}$ C./sec, can be used. Illustrative examples of procedures which can be used to make the amorphous metals are the rotating double roll procedure described in H. S. Chen and C. E. Miller in Vol. 41, Review of Scientific Instruments, pp. 1237–1238 (1970) and the rotating cylinder technique described by R. Pond, Jr. and R. Maddin in Vol. 245, Transactions of the Metallurgical Society, AIME, pp. 2475–2476 (1969).

More recently, in a patent issued to H. S. Chen and D. E. Polk (U.S. Pat. No. 3,856,513, issued Dec. 24, 1974), amorphous metal alloys at least 50% amorphous have been disclosed having the formula $M_aY_bZ_c$, where M is at least one metal selected from the group consisting of iron, nickel, chromium, cobalt and vanadium, Y is at least one element selected from the group consisting of phosphorus, carbon, and boron, Z is at least one element selected from the group consisting of aluminum, silicon, tin, antimony, germanium, indium and beryllium, a ranges from about 60 to 90 atom percent, b ranges from about 10 to 30 atom percent, and c ranges from about 0.1 to 15 atom percent. These alloys have been found suitable for a wide variety of applications including ribbon, sheet, wire, etc. The amorphous alloys also may have the formula $T_iX_j$, where T is at least one transition metal, X is at least one element selected from the group consisting of aluminum, antimony, beryllium, boron, germanium, carbon, indium, phosphorus, silicon and tin, i ranges from about 70 to 87 atom percent and j is the balance. These alloys have been found suitable for wire applications.

While these alloys are finding a wide variety of applications, there remains a need for a high strength, low density material suitable for structural applications.

SUMMARY OF THE INVENTION

In accordance with the invention, high strength, low density amorphous metal alloys are formed from compositions having about 48 to 68 atom percent titanium, about 32 to 52 atom percent beryllium, with a maximum of up to about 10 atom percent of beryllium replaced by at least one additional alloying element, selected from the group consisting of transition metals listed in Groups IB to VIIB and Group VIII Rows 4, 5 and 6 of the Periodic Table, and metalloid elements—phosphorus, boron, carbon, aluminum, silicon, tin, germanium, indium and antimony. Preferably, amorphous titanium-beryllium base alloys are formed from compositions having about 50 to 61 atom percent titanium, about 37 to 41 atom percent beryllium and about 2 to 10 atom percent of at least one element selected from the group consisting of aluminum, boron, tantalum and zirconium. Also, preferably, amorphous titanium-beryllium binary alloys are formed from compositions having from about 58 to 68 atom percent titanium and from about 32 to 42 atom percent beryllium. In addition to high strength and low density, these preferred amorphous alloys evidence good ductility.

These alloys take a variety of shapes, including wire, ribbon, sheet, etc. and find a number of uses in applications requiring a high strength-to-weight ratio.

DETAILED DESCRIPTION OF THE INVENTION

The amorphous metal alloys in accordance with the invention comprise about 48 to 68 atom percent titanium and about 32 to 52 atom percent beryllium, with a maximum of up to about 10 atom percent of beryllium replaced by at least one additional alloying element selected from the group consisting of transition metal elements and metalloids. The transition metal elements are those listed in Groups IB to VIIB and Group VIII, Rows 4, 5 and 6 of the Periodic Table. The metalloid elements include phosphorus, boron, carbon, aluminum, silicon, tin, germanium, indium and antimony. Examples of preferred additional alloying elements include boron, aluminum, tantalum and zirconium. Preferably, the amorphous metal alloys have a composition consisting essentially of about 50 to 61 atom percent titanium, about 37 to 41 atom percent beryllium and about 2 to 10 atom percent of at least one element selected from the group consisting of aluminum, boron, tantalum and zirconium. The purity of all elements is that found in normal commercial practice.

Figure 1:
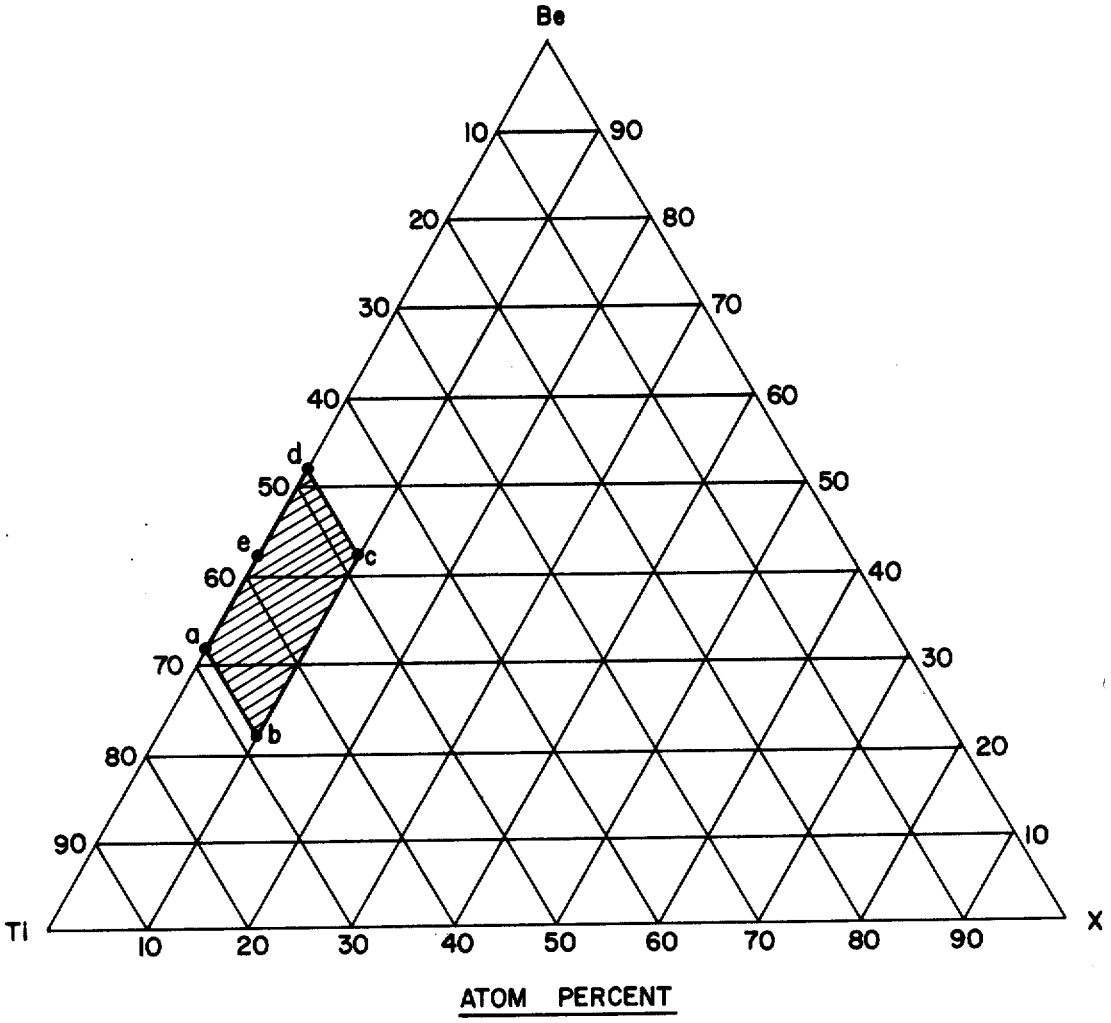
FIG. 1 is a ternary phase diagram, in atom percent, of the system Ti—Be—X, where X represents at least one additional alloying element, depicting the glass-forming range.

FIG. 1, which is a ternary composition phase diagram, depicts the glass-forming region of the invention. This region, which is designated by the polygon a—b—c—d—a, encompasses glass-forming compositions having high strength, good ductility and low density.

Figure 2:
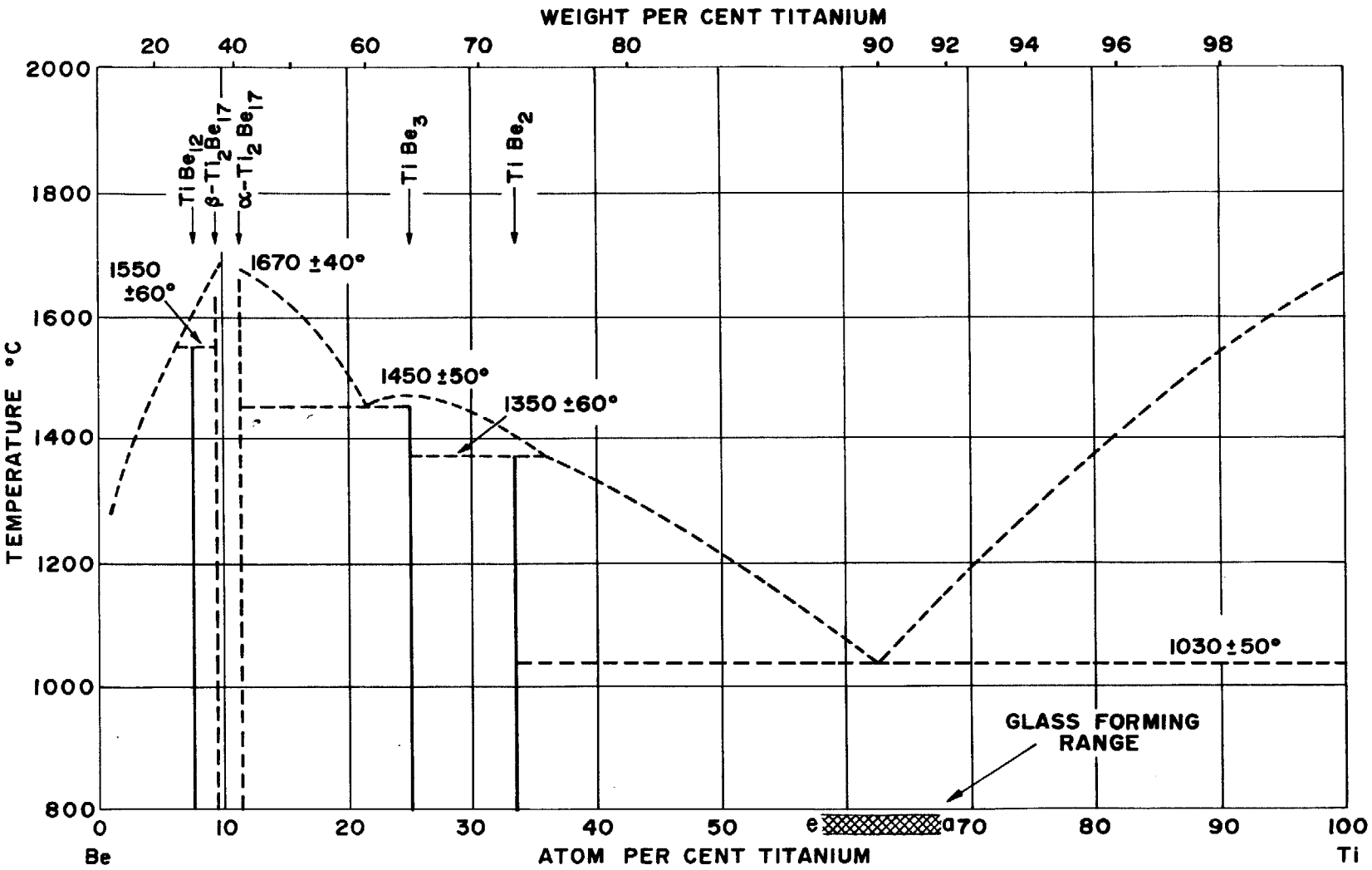
FIG. 2 is a binary phase diagram, in atom percent, of the system, Ti—Be, depicting the glass-forming range.

Preferably, the amorphous metal alloys have a binary composition consisting essentially of about 58 to 68 atom percent titanium and about 32 to 42 atom percent beryllium. Such preferred alloys evidence high strength and low density, resulting in a high strength-to-weight ratio. In FIGS. 1 and 2, the preferred range is depicted by the line a–e. As a consequence of the high strength-to-weight ratio realized for the binary strength, it is preferred that any additional alloying elements added have a relatively low density in order to retain the favorable strength-to-weight ratio.

The amorphous metal alloys are formed by cooling a melt at a rate of about $10^5$° to $10^6$° C./sec. A variety of techniques are available, as is now well-known in the art, for fabricating splat-quenched foils and rapid-quenched continuous ribbons, wire, sheet, etc. Typically, a particular composition is selected, powders or granules of the requisite elements in the desired proportions are melted and homogenized, and the molten alloy is rapidly quenched on a chill surface, such as a rotating cylinder. Due to the highly reactive nature of these compositions, it is preferred that the alloys be fabricated in a non-reactive atmosphere, such as an inert gas or in a partial vacuum.

While amorphous metal alloys are defined earlier as being at least 50 percent amorphous, a higher degree of amorphousness yields a higher degree of ductility. Accordingly, amorphous metal alloys that are substantially amorphous, that is, at least 90 percent amorphous, are preferred. Even more preferred are totally amorphous alloys.

EXAMPLES

An arc-splat unit for melting and liquid quenching high temperature reactive alloys was used. The unit, which was a conventional arc-melting button furnace modified to provide "hammer and anvil" splat quenching of alloys under inert atmosphere, included a vacuum chamber connected with a pumping system. The quenching was accomplished by providing a flat-surfaced water-cooled copper hearth of the floor of the chamber and a pneumatically driven copper-block hammer positioned above the molten alloy. As is conventional, arc-melting was accomplished by negatively biasing a copper shaft provided with a non-consumable tungsten tip inserted through the top of the chamber and by positively biasing the bottom of the chamber. All alloys were prepared directly by repeated arc-melting of constituent elements. A single alloy button (about 200 mg) was remelted and then "impact-quenched" into a foil about 0.004 inch thick by the hammer situated just above the molten pool. The cooling rate attained by this technique was about $10^5$° to $10^6$° C./sec.

The impact-quenched foil directly beneath the hammer may have suffered plastic deformation after solidification. However, portions of the foil formed from the melt spread away from the hammer were undeformed and hence suitable for hardness and other related tests. Hardness was measured by the diamond pyramid technique, using a Vickers-type indenter consisting of a diamond in the form of a square-based pyramid with an included angle of 136° between opposite faces.

Various compositions were prepared using the arch-splating apparatus described above. A non-reactive atmosphere of argon was employed. Amorphousness was determined by X-ray diffraction. Beryllium-rich compositions, such as $Ti_{40}Be_{60}$ and $Ti_{50}Be_{50}$, formed an amorphous alloy only at very extreme quench rates (much greater than about $10^6$° C./sec). The eutectic composition, $Ti_{63}Be_{37}$, and a hyper-eutectic composition, $Ti_{60}Be_{40}$, easily formed totally amorphous alloys in the quench rate range of about $10^5$° to $10^6$° C./sec.

The $Ti_{63}Be_{37}$ composition exhibited two crystallization peaks of about 460° C. and 545° C., as determined by differential thermal analysis (DTA; scan rate 20° C./min), a hardness of about 450 to 550 DPH, as measured by the diamond pyramid techinque and a density of 3.83 g/cm$^3$.

The $Ti_{60}Be_{40}$ composition exhibited a crystallization peak of 423° C., as determined by DTA, a hardness of 630 DPH and a density of 3.76 g/cm$^3$.

Other amorphous metal alloys of titanium and beryllium with one or more additional alloying elements of aluminum, boron, tantalum, and zirconium were prepared by the procedure described above. The compositions, their observed crystallization temperatures ($T_c$), hardness values (DPH) and densities (P) are listed in the Table below.

TABLE

| Composition, atom percent | | | | | | | | |
|---|---|---|---|---|---|---|---|---|
| Be | Ti | Al | B | Ta | Zr | $T_c$ °C. | DPH | p,g/cm$^3$ |
| 40 | 58 | 2 | — | — | — | 417 | 674 | 3.80 |
| 40 | 58 | — | 2 | — | — | 403 | 640 | 3.85 |
| 40 | 50 | — | 10 | — | — | 362 | 880 | 3.55 |
| 40 | 55 | — | — | 5 | — | 407 | 810 | 4.28 |
| 40 | 50 | — | — | 10 | — | 475 | 818 | 4.69 |
| 40 | 54 | 3 | — | 3 | — | 437 | 650 | 3.90 |
| 40 | 56 | 2 | 2 | — | — | 455 | 678 | 3.56 |
| 40 | 58 | — | — | — | 2 | 419 | 720 | 3.84 |
| 40 | 50 | — | — | — | 10 | 412, 437 | 718 | 4.10 |

Because of the strength of these alloys, based on the hardness data, and their low density, these alloys are useful in applications requiring high strength-to-weight ratios, such as structural applications in aerospace and as fibers in composite materials.

What is claimed is:

1. A high strength, low density metal alloy that is substantially amorphous, characterized in that the alloy comprises about 48 to 68 atom percent titanium and about 32 to 52 atom percent beryllium, with a maximum of up to 10 atom percent of beryllium replaced by at least one additional alloying element selected from the group consisting of the transition metals listed in Groups IB to VIIB and Group VIII, Rows 4, 5 and 6, of the Periodic Table and of the metalloid elements—phosphorus, boron, carbon, aluminum, silicon, tin, germanium, indium and antimony.

2. The alloy of claim 1 in which said additional alloying element is selected from the group consisting of aluminum, boron, tantalum and zirconium.

3. The alloy of claim 2 in which the alloy consists essentially of about 50 to 61 atom percent titanium, about 37 to 41 atom percent beryllium, and about 2 to 10 atom percent of at least one element selected from the group consisting of aluminum, boron, tantalum and zirconium.

4. The alloy of claim 1 in which the alloy consists essentially of about 58 to 68 atom percent titanium and about 32 to 42 atom percent beryllium.

5. The alloy of claim 4 in which the alloy has the composition $Ti_{63}Be_{37}$.

6. The alloy of claim 4 in which the alloy has the composition $Ti_{60}Be_{40}$.

* * * * *